(12) United States Patent
Seban et al.

(10) Patent No.: US 11,354,553 B2
(45) Date of Patent: Jun. 7, 2022

(54) RADIOFREQUENCY DEVICE WITH ADJUSTABLE LC CIRCUIT COMPRISING AN ELECTRICAL AND/OR ELECTRONIC MODULE

(71) Applicant: THALES DIS FRANCE SAS, Meudon (FR)

(72) Inventors: Frédérick Seban, Gemenos (FR); Arek Buyukkalender, Gemenos (FR); Claude-Eric Penaud, Gemenos (FR); Jean-Luc Meridiano, Gemenos (FR); Christophe Bousquet, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 53 days.

(21) Appl. No.: 16/061,373

(22) PCT Filed: Dec. 12, 2016

(86) PCT No.: PCT/EP2016/080698
§ 371 (c)(1),
(2) Date: Jun. 12, 2018

(87) PCT Pub. No.: WO2017/102667
PCT Pub. Date: Jun. 22, 2017

(65) Prior Publication Data
US 2018/0373970 A1 Dec. 27, 2018

(30) Foreign Application Priority Data

Dec. 14, 2015 (EP) ..................... 15306997

(51) Int. Cl.
*G06K 19/07* (2006.01)
*G06K 19/077* (2006.01)
(Continued)

(52) U.S. Cl.
CPC ... *G06K 19/0726* (2013.01); *G06K 19/07779* (2013.01); *G06K 19/07794* (2013.01); *H01Q 1/2225* (2013.01); *H01Q 7/00* (2013.01)

(58) Field of Classification Search
CPC ........ H01L 2924/0002; H01L 2924/00; G06K 19/072; G06K 19/0723; G06K 19/0726;
(Continued)

(56) References Cited

U.S. PATENT DOCUMENTS 6,538,313 B1 * 3/2003 Smith ................. H01L 23/3107
257/528
2002/0070280 A1 * 6/2002 Ikefuji ................ G06K 19/072
235/492
(Continued)

FOREIGN PATENT DOCUMENTS

CN 104078756 A * 10/2014 .......... H01Q 1/2225
EP 0 992 366 A1 4/2000
(Continued)

OTHER PUBLICATIONS

International Search Report (PCT/ISA/210) dated Feb. 24, 2017, by the European Patent Office as the International Searching Authority for International Application No. PCT/EP2016/080698.
(Continued)

*Primary Examiner* — Thien M Le
*Assistant Examiner* — Tae W Kim
(74) *Attorney, Agent, or Firm* — Marc Boillot—Thales DIS CPL USA, Inc

(57) ABSTRACT

Radiofrequency device with adjustable LC circuit comprising an electrical and/or electronic module. The invention relates to a communication device with a radio-frequency chip, said device comprising—an insulating support layer, —an electrical and/or electronic radiofrequency circuit on said insulating layer, said circuit comprising plates of an
(Continued)

adjustable capacitor and/or an antenna spiral with adjustable inductance, —at least one element for adjusting a tuning frequency of the radiofrequency circuit. The device is distinguished in that said plates and/or spiral are included in an electrical and/or electronic chip card module, and in that said adjusting element connects an intermediate point of the spiral so as to decrease the available inductance and/or splits or links the plates so as to adjust the capacitance.

13 Claims, 3 Drawing Sheets

(51) Int. Cl.
  *H01Q 1/22* (2006.01)
  *H01Q 7/00* (2006.01)
(58) Field of Classification Search
  CPC ....... G06K 19/07745; G06K 19/07749; G06K 19/07779; G06K 19/07794; H01Q 1/2225; H01Q 7/00
  USPC ........................................................ 235/492
  See application file for complete search history.

(56) References Cited

U.S. PATENT DOCUMENTS

2007/0268113 A1* 11/2007 Johnson ............... G08B 13/242
                                                                340/10.1
2015/0097040 A1* 4/2015 Rampetzreiter ........................... G06K 19/07779
                                                                235/492

FOREIGN PATENT DOCUMENTS

| EP | 0992366 A1 | 4/2000 |
| EP | 1010543 A1 | 6/2000 |
| EP | 1 242 970 B1 | 5/2006 |
| FR | 2 743 649 A1 | 7/1997 |
| JP | H10-193848 A | 7/1998 |
| JP | 2002-150245 A | 5/2002 |
| WO | 02/089053 A1 | 11/2002 |
| WO | WO 2005/104022 A1 | 11/2005 |
| WO | WO2005104022 A1 | 11/2005 |

OTHER PUBLICATIONS

Written Opinion (PCT/ISA/237) dated Feb. 24, 2017, by the European Patent Office as the International Searching Authority for International Application No. PCT/EP2016/080698.

Office Action (Notice of Reasons for Refusal) dated Apr. 23, 2019, by the Japan Patent Office in corresponding Japanese Patent Application No. 2018-531215 and English translation of the Office Action. (4 pages).

Office Action dated Oct. 11, 2021 for co-pending Application in Singapore N° 11201804343Y.

* cited by examiner

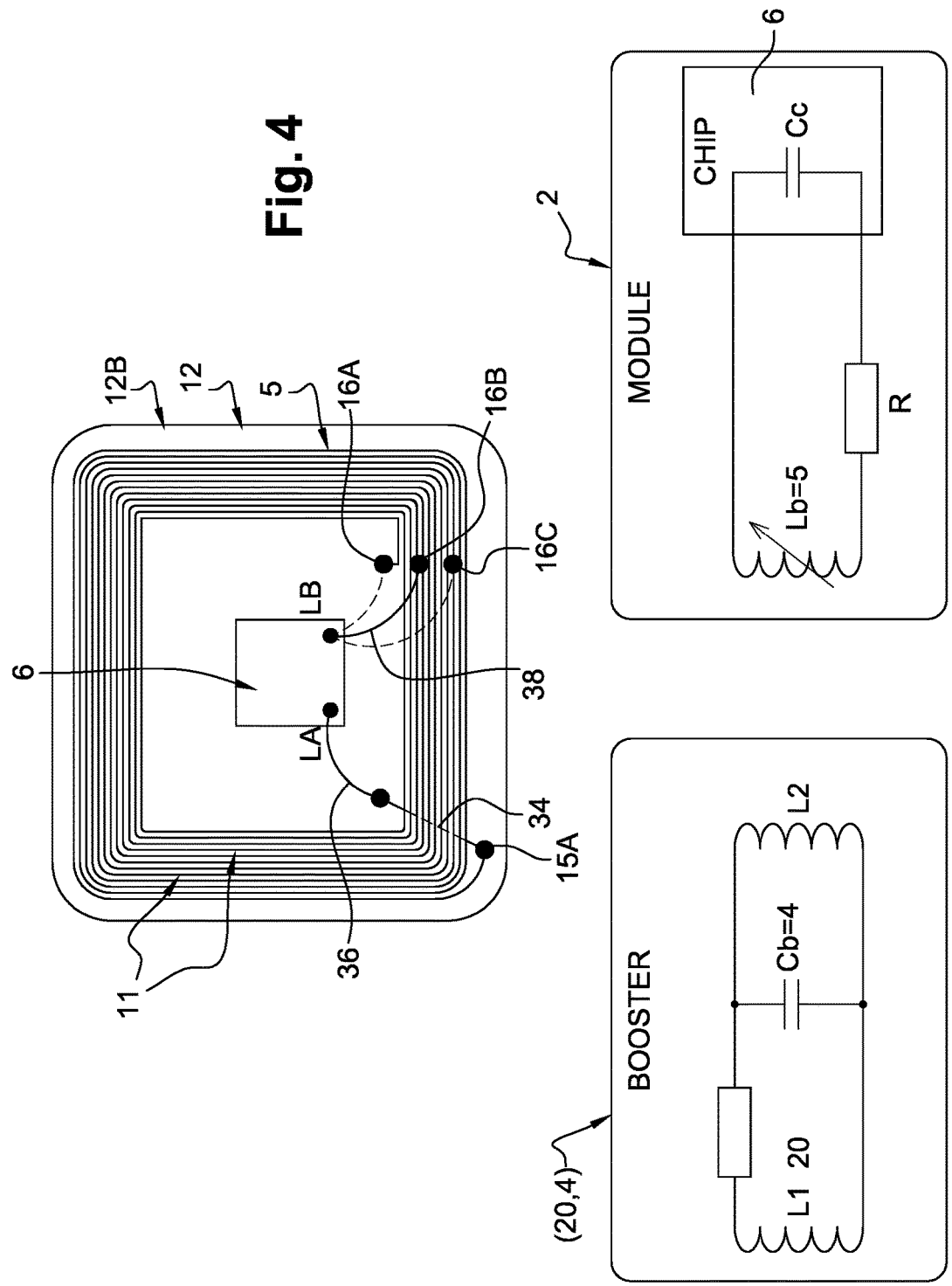

RADIOFREQUENCY DEVICE WITH ADJUSTABLE LC CIRCUIT COMPRISING AN ELECTRICAL AND/OR ELECTRONIC MODULE

FIELD OF THE INVENTION

The invention relates to a radiofrequency communication device comprising an electrical circuit with a radiofrequency chip, wherein said device has an adjustable capacitance and/or inductance for adjusting a tuning frequency of the electrical circuit with a radiofrequency chip.

In particular, the device comprises an integrated circuit module with a capacitance and/or inductance, wherein said module is configured to be connected or coupled to a radiofrequency antenna or relay antenna arranged outside the module, particularly in a device body which may be a card body, or any other electrical or electronic device.

The invention may in particular concern the field of electronic media, such as contact and/or contactless chip cards or hybrid cards, radiofrequency tickets or labels (RFID), radiofrequency transponders, and inserts (or inlays) incorporating or constituting such a module.

The invention is also directed towards passport cover page or biodata pages.

Such radio frequency devices (or electronic media) may comply with ISO/IEC 14443 or ISO 78016 or ICAO or ISO/IEC 15693 standards.

In a preferred application, the electronic module according to the invention bears an antenna and is associated with a passive or booster relay antenna to increase the range of radiofrequency communication. The passive antenna and/or the module can preferably be placed in a chip card body or any other device, for instance a telephone, in detachable or bonded form.

PRIOR ART

Patent EP1242970 (B1) describes radiofrequency devices comprising an electrical circuit with a radiofrequency chip. The circuit comprises capacitor plates forming a capacitance and an antenna forming an inductance. At least the capacitance and/or inductance are/is adjustable, by adding or removing conductive material, particularly by laser, in order to adjust a tuning frequency of the electrical circuit. This patent is directed towards small electronic labels (tags) or contactless or hybrid cards (contact and contactless).

In addition, patent FR 2743649 describes a chip card module with an antenna and/or contact pads capable of being incorporated in a card body or forming an RFID tag.

Furthermore, hybrid radiofrequency devices are also known, such as contact and contactless cards, comprising a contact module incorporated in a card body and connected to an antenna housed in the card body.

Also known are booster antennas or RLC circuits that take the electromagnetic flux from a radiofrequency reader and concentrate it to a coil on a chip card module which is another radiofrequency transponder RLC circuit. Each "booster antenna and antenna module has its own resonance frequency, respectively $$f_{0M} = \frac{1}{2\pi\sqrt{L_M C_C}} \text{ and } f_{0B} = \frac{1}{2\pi\sqrt{L_B C_{B'}}},$$

designed such that once coupled together, the resulting global equivalent system is tuned to comply with an RFID (Radiofrequency Identification Device) system operating at 13.56 MHz or even 14 MHz.

In order to achieve the adjustment, transponders developed with technology using an antenna on the module are limited by the fact that each chip type has its own internal capacitance (Cc) that affects the resonance frequency fOM of the antenna on the module. Since module support films are not readily adaptable to modifications, the current state of the art provides for adaptation of the resonance frequency of the booster (relay antenna) FOB to that of the module when there is a change of chip. The adaptation may involve designing a new relay antenna in the card body receiving the module.

Technical Problem

Currently, in order to adapt manufacture of a radiofrequency device to a new radiofrequency chip capacitance value, current practice of the state of the art involves redesigning the module support film to change the number of turns of the module antenna. Alternatively and additionally, practice provides for adjusting the resonance frequency of the antenna in the card body, whether of relay type or not (booster antenna). In the latter case (non-relay), the antenna in the body is directly electrically connected to the chip.

The common method above does not allow for flexible (or practical) means of adjusting the capacitance and/or inductance of the module.

The above adjustment currently used is restrictive, since it does not allow flexibility or versatility in manufacture of the product or device.

It is necessary to redefine and engrave a new module or a new antenna in the chip card body at each change of type of radiofrequency chip displaying a significant internal variation in capacitance.

SUMMARY OF THE INVENTION

The principle of the invention involves designing a support film (or insulating support layer) configuration of a metallized (or conductive) module that allows adjustment of capacitance and/or inductance to compensate for variations in internal capacitance of the chips (Cc) during change of the latter or provisioning by different suppliers. The adjustment keeps the resonance frequency FOM as constant as possible or at least minimises the variation that would result.

The resonance frequency is considered constant when it varies more or less by a few Mhz. Preferably, for a given application, the invention provides for a low resonance frequency variation tolerance, in particular 2 MHz or even 0.5 MHz. In the preferred applications, the resonance frequency to be observed may itself be between approximately 13 MHz and 27 MHz depending on the applications.

In the case of a radiofrequency device with a module interacting with an electrical element arranged outside the module (for instance, in a card body, a box, a printed circuit board (PCB) of an electronic device), it is easier to perform the adjustment (particularly for a tuning frequency), at the module rather than to perform this outside the module, particularly on an electrical element in a card body or another medium interacting with the module.

Thus, this is the first time that a radiofrequency device comprising an electronic chip module (complying in particular with ISO 7816 standard) is proposed that is adjustable by acting solely on the module capacitance and/or antenna. In order to adjust a frequency tuning, the invention makes it possible to act on an adjustable standard module and retain a standard card medium body without any change in the electrical circuit (antenna and/or capacitance) at its level.

Since the modules are produced in reels and continuous tapes (35 mm wide), it is easy and practical to act at their level. It is above all practical to perform a frequency adjustment at manufacturing stations already existing on the current production lines. Hence, it is preferable to make provision for supply of a single predefined module having by default:

the maximum available inductance reserve, even if it means subsequently reducing the latter according to the need for adjustment in a simple additive electrical connection operation, and/or the maximum available capacitance reserve that one increases from a minimum, simply by one or several subsequent electrical connections, according to the need for adjustment in a simple additive electrical connection operation. (However, in an alternative, less practical embodiment, the adjustment may be subtractive)

The inventors have surprisingly observed that, despite the small dimensions of a support film of the chip card module (ISO 7816), the few metallizations available and the presence of unalterable electrical contact zones, it is possible to propose a generic module configuration that allows a sufficient number of variations in capacitance and/or inductance to maintain a constant frequency tuning of the overall radiofrequency transponder system.

The invention makes it possible to avoid complete modification of the radiofrequency circuit, the internal capacitance (Cc) may vary by more than 3 µf, 5 µf or indeed 7 µf or even 10 µf or 17 µf from one chip type to another.

Hybrid or contact modules according to ISO 7816 standard generally have dimensions of less than approximately 15×25 mm (or equivalent area), for example 8.32×11 mm; 10.8×13 mm; 11.8×13 mm, etc.

Furthermore, ISO 7816 standard makes provision for eight or six electrical contact zones, which are unalterable (any modification thereof is prohibited), on the contact pads for connecting an external reader.

Preferably, the invention provides for adjustment means allowing a significant adjustment of more than 10 microfarads (17 µF for example) to accommodate chips having intrinsic capacitance differences greater than 10 µF (microfarads).

One of the ideas of the invention involves using the central portion of the module to create a series of capacitances that can be enabled or disabled by simple electrical connection, particularly by wire bonding, (or break in electrical connection), preferably performed during the conventional chip wiring operation.

Furthermore, an alternative or additional idea for obtaining an adjustable RLC circuit is to allow configuration of inductance of an antenna helix or coil that is variable on the module. This can be performed by connecting the chip to the antenna at different points of the helix.

Generally speaking, the invention advantageously provides for a single module configuration allowing easy variation of any of the three intrinsic RLC parameters of the module or of combining two or three of these parameters.

The invention also provides for having a support body (particularly a card body) standardised during manufacture (with a single configuration), with electrical elements that include for example, a relay antenna or a radiofrequency transponder antenna connected (or coupled) directly to the module, with adjustment being performed on the module.

The aim of the invention is therefore a radiofrequency communication device with a radiofrequency chip, wherein said device comprises an insulating support layer, an electrical and/or electronic radiofrequency circuit on said insulating support, wherein said circuit comprises plates of an adjustable capacitor and/or an antenna helix with adjustable inductance and at least one element for adjusting a tuning frequency of the radiofrequency circuit;

The device is characterised in that said plates and/or helix are included in an electrical and/or electronic module of a chip card and in that said adjustment element connects an intermediate point in the helix to reduce the available inductance and/or splits or connects the plates to adjust the capacitance.

Generally, the module may visibly display at least one (or several) mark(s), element(s) or mean(s) of adjusting said capacitance and/or the first antenna.

According to other characteristics

The module has a main face having an area less than or equal to 375 mm2 (25×15 mm);

The adjustment equals or compensates for a variation in internal capacitance of the chip of more than 5;

According to an alternative, the device comprises a support body incorporating or interacting with said module and the support body bears an electrical element of the electrical and/or electronic circuit, wherein said element is configured to connect or interact with the module;

The electrical element is selected from among a radiofrequency chip, a second antenna, a relay antenna and a second capacitance configured to connect or interact with said electrical circuit;

The module comprises at least two second conductive plates on said second face arranged opposite at least said first plate so as to form said adjustable capacitor, wherein said plates are connected electrically by at least one electrical connection;

The electrical connection between said two second plates is a bonded wire or a conductive pattern or an electrically conductive deposit;

The electrical connection can be pre-wired by metallization of the insulating layer and has a de-short-circuiting break mark.

The antenna is formed on the module, comprises several helices and features connection ends or terminals emerging on the second face;

The antenna is formed outside the module and in that the module comprises interconnection pads emerging on the second side, wherein said pads are configured to connect antenna connection ends or terminals;

The device forms a chip card or a passport, comprising a passive antenna coupled electromagnetically to the module antenna.

The invention also relates to a method for manufacturing the above device. It comprises the following stages for producing a chip card-type module (particularly with dimensions of less than 20×15 mm), bearing said adjustable capacitance and/or first inductance; of adjustment of the capacitance and/or the antenna; and of incorporation of the module in said support body.

The invention may however apply to modules (or devices) that are not of the chip card type, comprising for example an insulating support film, particularly made of plastic (or outside a chip) bearing the capacitor plates and/or an antenna.

BRIEF DESCRIPTION OF THE FIGURES

FIGS. 4 and 5 illustrate a second embodiment of a chip card module according to the invention.

DESCRIPTION

Figure 1:
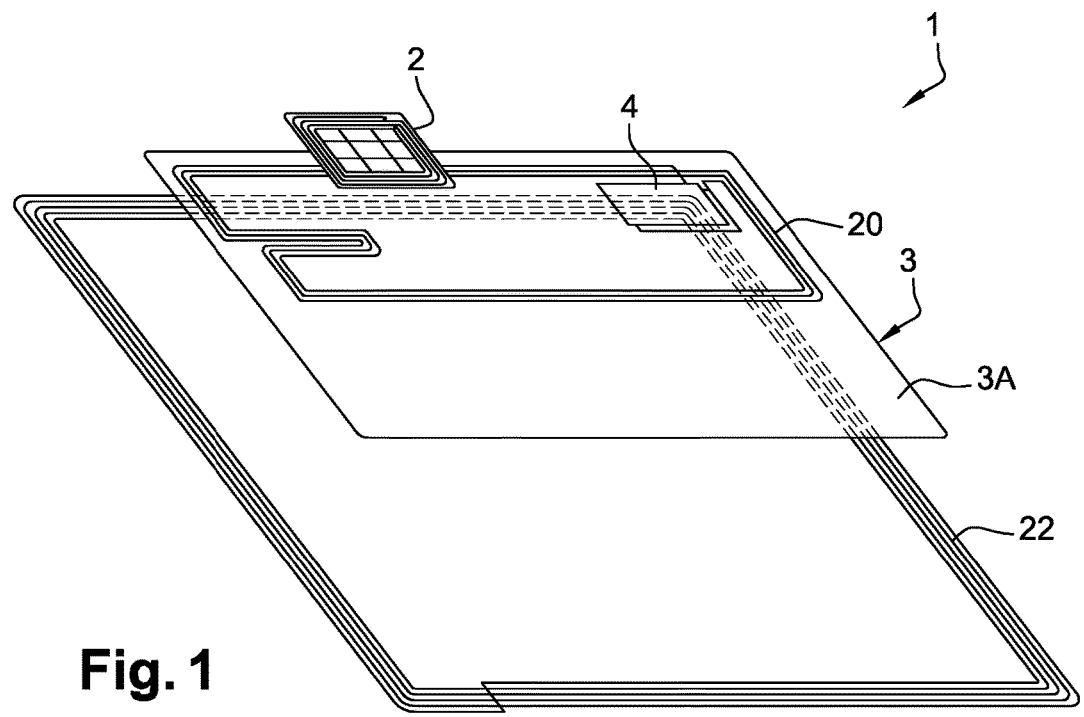
FIG. 1 illustrates an exploded view of a system for radiofrequency communication between a reader and a radiofrequency device according to the invention in the form of a chip card, according to an embodiment of the invention.

The same references in the drawings indicate identical or similar components.

FIG. 1 illustrates a system for radiofrequency communication between the antenna 22 of a reader and a radiofrequency device 1 according to the invention in the form of a radiofrequency chip card (in an exploded view), according to one embodiment.

The card 1 comprises an insulating support layer 12 bearing an integrated circuit chip 6 and an antenna 5, wherein the insulating support layer belongs in this case to an electronic module 2 inlaid in a cavity of the card body 3. The card body 3 comprises a booster antenna 20 (or a passive or relay antenna) on a face 3A of the body 3, connected to a capacitor 4. The assembly comprising a radiofrequency transponder (chip, antenna, capacitance) on the module and the passive antenna (20, 4) of the card body 3, is tuned to a resonance frequency close to 13.56 MHz.

In the following figures, in general, the invention describes a device (which may or may not consist of the module alone) comprising an electrical circuit with a radio frequency chip 6. The module circuit comprises capacitor plates or tracks 13A-13H forming a capacitance and a first antenna 5 forming an inductance Lb; the capacitance (Cv; 14) and/or the inductance 5 (Lb) are/is respectively adjustable by adjusting the deployed area of the plates and/or that of the antenna in order to adjust a frequency tuning of the electrical circuit 2. More or less deployed or available area is used up to a maximum for adjustment.

Adjustment leaves an adjustment mark, following production of the antenna and/or of the capacitor plates, according to the adjustment means employed, as subsequently explained (partial connection of the available plates, abrasion of connections between plates and perforation of the connection between two plates . . . ).

Likewise, fewer antenna turns in relation to the length of antenna available and deployed on the device may be used for the inductance.

The total area deployed in the example for the capacitor comprises the area of the external plate 13A and the sum of the individual plates 13B to 13H. The area used may correspond to the area of the plate 13A and that of the number of plates connected to each other and to the chip.

According to one characteristic, the device comprises a module 2 incorporated in a support body 3; the module bears the adjustable capacitance 14 and/or first antenna; the module comprises the insulating layer 3 (dielectric support film) spacing said superimposed plates and/or bearing said antenna.

Preferably, the insulating layer may be selected from among various different substrates which, depending on their specific relative permittivity characteristic (or dielectric constant), allow different thicknesses of the assembly. For example, for PVC, the coefficient of permittivity εr of which=5, the preferred maximum thickness is equal to approximately 50 µm. Conversely, for polypropylene, the coefficient of permittivity εr of which is 2.2, the preferred maximum thickness is approximately 80 µm, etc. . . . )

The support body may be a chip card body 3, a passport cover, a box or printed circuit board PCB of a portable telephone, watch, portable computer or any insulating support body. The available area 3A of the support body to receive a relay (or standard) antenna corresponds, in one embodiment, to that of a card face in ISO 7812 format (bank card format). In other applications or embodiments, the support body 3 has an available area 3A for a flat or flat helical antenna twice the size of that module or 3 or 4 or 5 times, or even 10 times the size or more.

According to other characteristics, the support body 3 may bear an electrical element (6, 4, 11, 14) of the electrical circuit; the electrical element is configured to connect or interact with said electrical module 2.

Thus, for example, the element may be selected from the radiofrequency integrated circuit chip 6, which may be located within the module 2 or remotely in the support body 3; the electrical element may comprise a second antenna. This second antenna may be a relay antenna 20 (or booster or passive antenna) or a first radiofrequency transponder antenna 5 directly connected to the chip or a second antenna (not illustrated) supplementary to the first antenna 5 of the module.

The element may be a second capacitance or the first capacitance (not illustrated) configured to connect or interact with said electrical circuit of the module. The capacitance in the support body may be the capacitor plates 14 mounted for example on a backing sheet of the support body receiving the module or in the form of a surface-mounted device (SMD).

Figure 2:
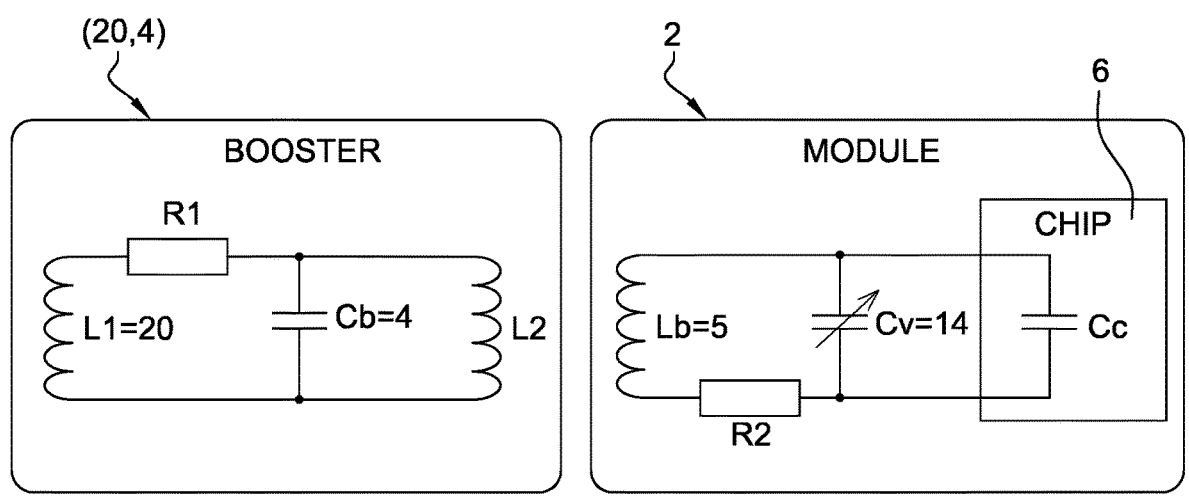
FIG. 2 illustrates the wiring diagram corresponding to the system in FIG. 1.

In FIG. 2, the relay antenna (booster) forms a first circuit comprising a resistance R1, at least one inductance L1 (20) and a capacitance Cb (4). As for the module 2, it forms another circuit (designed to interact with the first circuit) comprising a resistance R2 in series with an inductance Lb (5), which is itself in parallel with a variable capacitance Cv (14).

Figure 3B:
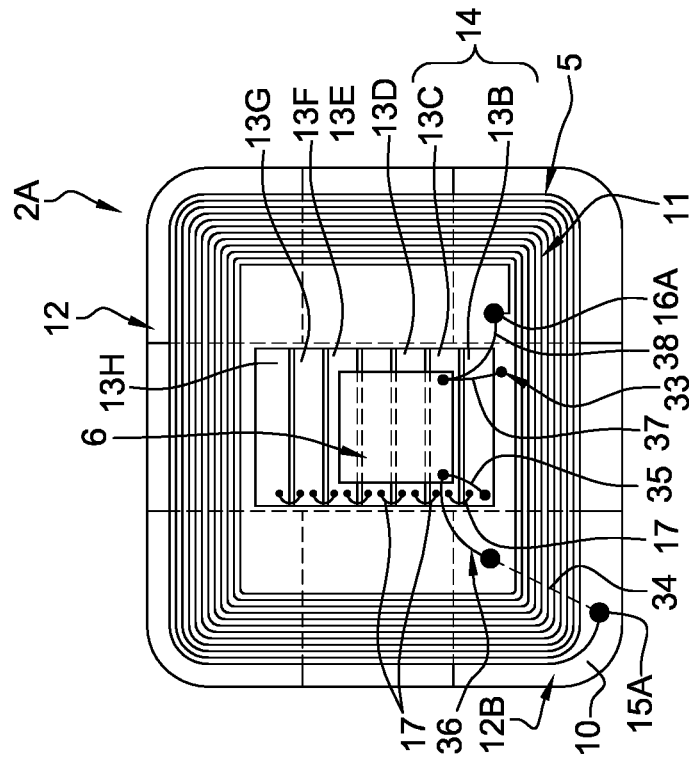
FIGS. 3A and 3B respectively illustrate, front and back, a first embodiment of a chip card module according to a preferred embodiment of the invention.
Figure 3A:
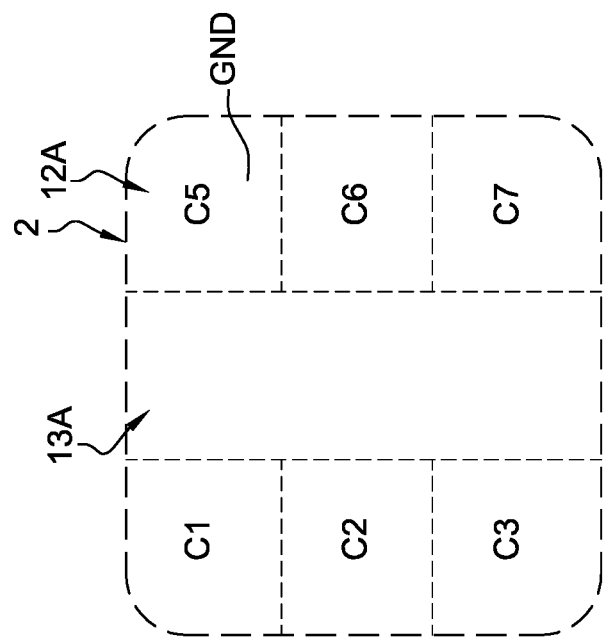

FIGS. 3A and 3B illustrate a detailed embodiment of the electrical and/or electronic module capable of being included or used in the embodiment in FIG. 1. Module 2 comprises an insulating layer 10 or 12, a support for metallizations or surfaces, conductive pads and electrically conductive tracks. The layer may be a dielectric insulating layer, particularly made of polyimide, of epoxy glass. The layer comprises an outer first face 12A (designed to be oriented towards the outside of the card body) and an internal opposite second face 12B (designed to the oriented towards the inside of the card body).

The module comprises, in the example, at least one first conductive plate 13A on said first face 12A of the insulating layer emerging on the second face 12B; the plate is formed in this case of an engraved metallization of the module, preferably a central metallization (normally not used to connect an electrical contact reader) of a module in ISO 7816 format. Alternatively, this plate may also comprise the ground contact GND.

The plate 13A comprises an area (or terminal) for interconnection to the module circuit, particularly to the chip. This area 33 is accessible by means of a conductive connection well or a conductive via passing through the insulating layer.

The module may comprise, preferably on the support film, an antenna 5 in the form of a flat helix featuring several turns 11 and interconnection ends (or terminals) 15A, 16A emerging on the second face 12B to connect the RF (radiofrequency) chip 6. The antenna 5 is preferably arranged on the inner concealed face 12B of the module. It may however be arranged on the outer face 12A, particularly at the periphery of the external metallization or of the possible ISO 7816 contact(s). The interconnection ends of the antenna 5 are accessible if necessary via the chip connections by means of connection wells or conductive vias through the insulating support layer 12.

Alternatively, the antenna 5 connected to the chip 6 may be outside the module, particularly on the chip card body 3 in which the module is inlaid. Thus, the invention may extend in particular to hybrid cards (contact and contactless) using a single antenna buried in the card body.

Thus, the radiofrequency circuit can be frequency tuned for several different types of chip from various manufacturers having internal capacitances varying in particular by more than 10 µF or 17 µF from one type to another and the frequency tuning can be performed at the module.

The module may comprise interconnection pads (not illustrated 15B, 16B) to interconnect an antenna arranged in the support body incorporating the module.

These pads may be similar to the connection end terminals (15A, 16A). These pads may be configured so as to connect ends (or terminals) of the antenna; these terminals may be accessible, particularly at the bottom of a cavity in the support body (not illustrated).

The interconnection pads of the module designed to interconnect the antenna of the card body may preferably emerge on the second face (12B) of the module. These pads may be arranged (in a manner known per se) in particular diametrically opposed to the chip and may be widened to facilitate interconnection with the antenna terminals arranged at the bottom of the cavity of the support body 3.

The module preferably comprises (as illustrated) a radiofrequency integrated circuit chip 6 connected to the antenna 5 and a capacitor to form a frequency-tuned radiofrequency transponder. Alternatively, the chip may be arranged on a printed circuit in the support body 3.

According to a characteristic of this first embodiment, the module may comprise at least one second conductive plate 13B on said second face 12B arranged opposite the first plate 13A so as to form said capacitor (Cv)=(14). This single-value capacitance may or may not be activated according to adjustment requirements.

According to another preferred characteristic of this first embodiment, the capacitor 14 of the module is formed of at least two second conductive plates 13B, 13C arranged on the second face positioned opposite at least the first plate 13A; the plates 13B and 13C and electrically connected by at least one electrical connection 17. This electrical connection constitutes an adjustment element for the frequency tuning of the entire radiofrequency transponder (chip, capacitor, antenna) by increasing the value of the capacitance.

In the example, the module features a plurality of rectangular plates 13B-13H engraved and/or bonded to the insulating layer 12 opposite the external plate 13A and between the helix of the antenna 5.

The plates 13B-13G, separated at the base, may all have the same area or be of different areas in order to increase the possibilities of connection to one another or to the chip or limit the number of links 17 between plates. For example, the plate 13C may be equal to 1, 5 times the plate 13B itself equal to 1, 2 times the area of the plate 13D.

These plates 13B-13G may all be connected in series by links 17 in order to obtain the highest capacitance value.

In the example, using a standard dielectric support film and by connecting all the plates, it is possible to obtain a capacitance value equal to approximately 14-17 µF (picofarad).

In this manner, by means of the invention, it is possible using the same module configuration to adjust the capacitance value in the RLC circuit of the module. It is therefore possible to procure and accommodate radiofrequency chips from different suppliers, with these electronic chips having substantially different internal capacitance values. RF chips of this kind call for frequency adjustments of up to 14 µF for the most common so as to retain the same resonance tuning frequency.

Alternatively, the outer face 12A of the module may comprise several plates instead of a single capacitor plate 13A. Each plate emerges on the second face 12B via one well or two through the insulating layer. The increase in area of the operational outer surface in the radiofrequency circuit can be achieved by connections between plates through the wells. Thus, the connections are not apparent from outside the module.

According to one characteristic, the electrical connection 17 between said two second plates is performed by at least one bonded wire. This connection may be advantageously carried out in concurrent operation time or at least at the same connection station as that performing the bonded wire connection of the chip to the antenna and/or if appropriate to the metallizations 13A on the outer face 12A. These metallizations may comprise contact pads C1-C7 to connect an electrical contact reader.

Alternatively, the electrical connection 17 between at least two second plates 13A, 13B may be established by any known means, particularly conductive printing (screen-printing, jet of conductive material) or an electrically conductive deposit (silver conductive adhesive . . . ). In particular, the module may be solely a radiofrequency module (without contact pads C1-C7 but with a plate 13A).

The electrical connection (17) can be pre-wired by metallization of the insulating layer; the capacitance adaptation can be obtained by subsequently de-short-circuiting at least one of the electrical connections. The connection may be previously engraved and severed in particular by laser.

Severing of an electrical connection 17 between two plates by abrasion, mechanical, laser or other or by punching displays a de-short-circuiting cutting mark. The mark may be an at least partial perforation of the connection and/or of its support. The frequency tuning adjustment element is in this case formed by this perforation, ablation or abrasion severing or splitting plates between each other in order to reduce the capacitance value. The perforation can be easily employed during production on a module tape or during a conventional de-short-circuiting operation by punching.

Coating of the chip and the connections 17, 35, 36, 37, 38 with protective insulating material is preferably performed.

In the example, connections 17 are made between certain individual plates 13B-13G according to the capacitance value to be obtained or adjusted; a connection 35 is also made between a pad (LA) of the chip and one of the plates 13B, particularly an end plate and a connection 35 between the chip and the external plate 13A.

If necessary, a connection is made between a pad LA of the chip and the antenna 5 via its interconnection terminal 15A external to the helix (or antenna) (redirected in this case inside the helix by a conductive bridge 34 on insulation).

A connection (wireline connection in this case) 38 of the pad LB of the chip 6 is also made to connect the interconnection terminal of the antenna arranged inside the helix of the antenna with a wire bonding connection 38.

In FIG. 4, according to a second embodiment (which may or may not allow equipment of the device in FIG. 1), the invention provides for an antenna on the module preferably located at the periphery of its substrate 12 (insulating support layer). This embodiment may be independent from the first embodiment and form an invention with an adjustable RLC circuit according to the invention. The adjustment is mainly performed in this case at the antenna using the inductance value.

The module differs from that in FIG. 3B insofar as it does not comprise any capacitor plates, either internally or externally. The chip may however comprise an intrinsic capacitance. Alternatively, in another variant of this embodiment (not illustrated), a capacitor may be added and connected to the antenna in the form of a surface-mounted integrated circuit chip (SMD) or by applying the principle mentioned above of a capacitance in the form of metallizations (13A-13H) on the insulating support layer 12.

According to a characteristic of this second embodiment (FIG. 4), the chip 6 is connected at an intermediate point 16B of the antenna (or helix); this intermediate point is located on a turn 11, between the end terminals 15A, 16A of the helix of the antenna 5. Thus, during connection of the chip, the invention may provide for skipping at least one portion of turn (or one or more turns). The invention may provide for eliminating portions of turns by severing, particularly by laser or abrasion or perforation much less important or less necessary.

The adjustment may also leave a corresponding mark, such as a perforation or a cut on the path of the antenna. Thus, all or part of the area of the antenna deployed can be used. The area or length of the antenna deployed in the example in FIG. 4 corresponds for example to the area of the insulating layer 12 covered by the turns used.

The area of the antenna used depends on the position of the intermediate point and corresponds in the example to the area of the portion of antenna included between the terminals (15A and 16C) or (15A and 16B) or (15A and 16A).

Advantageously, the invention provides for precise selection of the desired point of connection along the entire path of the turns in order to allow optimum adjustment of frequency tuning. The frequency tuning adjustment element is in this case in the form of the connection 38 at an intermediate point 16B located on the path of the antenna helix between the initial terminals 15A-16A of the antenna. A shorter path (shorter than the initial path of the antenna 15A-16A) defined by intermediate connection points reduces the available initial inductance of the antenna.

The width of the turns can be designed so as to bear a wire bonding (without selective increase in the width of the turns). Alternatively, several predetermined points (or areas) can be widened along the path of the antenna or of the turns to facilitate bonding. For example, at least one (or several) turns may comprise at last one widened bonding or connection area. The number of widened connection areas may be 2 or 3 or 4 or 5 or at least one turn. The areas may or may not be spaced at regular intervals. The area may for example be a square or a circle doubling the width of the turn at each connection point.

In the above example, the chip 6 may be connected to the antenna 5 at three alternative positions 16A, 16B, 16C corresponding to different inductance values according to the frequency tuning requirement.

In general, the connection terminal 16A will be used for chips having a small capacitance and connection 16B will be used for chips having moderate capacitance and connection 16C for chips having a high capacitance.

The value of this solution lies in the fact that the interconnection terminal 16B may be anywhere on the coil 5, even without having a complete turn or loop; the frequency tuning adjustment can be highly precise to maintain a constant and not merely approximate resonance frequency FOM.

The width of the turns may be compatible with the area required for a bonded wire connection.

Thus, by means of this embodiment, the antenna may be designed with different intermediate points or interconnection terminals 16B, 16C corresponding to predetermined inductance values of the antenna.

Thus, it is possible, depending on the characteristics of the electronic radiofrequency chip, in particular its internal capacitance Cc, to optimally adjust the RLC value of the corresponding resonant circuit on the module.

The antenna may also comprise turns or intermediate interconnection terminals created (particularly by deflecting or redirecting the turns) near the location of the chip or its protective resin coating so as to facilitate coating of the interconnection wires 16B, 16C. If necessary, redirection tracks which may or may not be predetermined with an insulating bridge extend from the intermediate interconnection terminals 16B, 16C towards the area of the chip or of its coating. However, constructing the radiofrequency circuit on a small module area also facilitates direct electrical connection, particularly of the bonded wire over the entire path of the helix. Coating of these wires for protection is also facilitated, since the wires are situated around and close to the chip.

According to a third embodiment, the invention provides for a combination of the first and second embodiment (FIG. 3A, 3B and FIG. 4).

In this case, (in order to be illustrated), the antenna in FIG. 3B is replaced by the antenna in FIG. 4 with potential locations of intermediate interconnection terminals 16B, 16C. (Indeed, the antenna 5 may be the same on both FIGS. 3B and 4, since the interconnection terminals 16B, 16C may be anywhere on the path of the antenna 5 without changing the width of the turns.

In this manner, it is easier to adjust the frequency tuning of the RLC radiofrequency transponder circuit by adjusting either the capacitance (or capacitor) 14, or the inductance Lb of the antenna, or both at the same time capacitance Cv.

The invention also provides for a device 1 such as a chip card, a passport, an electronic box, a PCB of watch, telephone or portable computer comprising the module 2 according to any of the embodiments described above.

The device may or may not comprise a passive antenna 20 electromagnetically coupled to the antenna 5 or RLC radiofrequency transponder circuit of the module 2.

Alternatively, (not illustrated), the chip may be flip-chip connected. Redirection tracks 34, 38 (particularly printed or material jet) of the different interconnection terminals of the module, may be required to accommodate different specific configurations of different chip pads.

Alternatively, (not illustrated), for all the embodiments, the capacitor on the module may be formed by conductive surfaces (tracks, rake conductive serrations) opposite each other and arranged on a same side of the module. For example, on one side of the main insulating layer of the module, it is possible to have conductive (or engraved metallic) tracks, in the form of a plurality of first notches that engage in other tracks in the form of a plurality of second notches complementary to the first notches. There may be a laminated plastic insulating layer on these notches (or a filler insulating material between the notches) so as to fill the air space between the notches opposite other and have a higher dielectric coefficient than air for the capacitor.

Likewise, the module may comprise a superimposition of metallizations and insulating layers in a direction perpendicular to the main surface of the module, particularly of a chip card.

In the example, it is possible to superimpose sequentially from the outside of the module first metallizations for the contact pads, a first dielectric insulating layer, a second metallization for the capacitor, a second insulating layer (particularly printed or laminated) and a third metallization for a capacitor plate in relation with the second or first metallization. Conductive wells passing through and/or redirection tracks are provided on or through the different insulating or conductive layers to connect the plates to the chip.

The invention preferably concerns in its applications radiofrequency devices in the form of a chip card, the support body (or card body) has dimensions and a shape according to the standards (and/or designations) below:

1FF (85.6 mm×53.98 mm×0.76 mm) according to standard ISO/IEC 7810:2003, ID-1

2FF (25 mm×15 mm×0.76 mm) according to standard ISO/IEC 7810:2003.

3FF (15 mm×12 mm×0.76 mm) according to standard ETSI
 TS 102 221 V9.0.0. Mini-UICC.

4FF (12.3 mm×8.8 mm×0.67 mm) according to standard ETSI TS 102 221 V11.0.0.

These radiofrequency devices above comprise an electrical and/or electronic module incorporated or embedded in the support body. This module according to one of the preferred embodiments of the invention comprises a radiofrequency circuit part that is adjustable in frequency tuning. The support body may preferably comprise at least a part of or the entire antenna connected or coupled (relay antenna) to the module. The antenna module can operate alone opposite a radio frequency reader or be coupled or connected to a circuit in the support body or another support.

The module can be regarded as the conventional electrical/electronic microcircuit mounted on the insulating layer, generally comprising the ISO 7816-2 contact pads and/or an antenna and the chip (if applicable or not if remote).

Generally speaking, for all the embodiments, the module (microcircuit) may be of a size larger than or equal to the size of a conventional module for a chip card above (for example, approximately 13×11 mm or even less for a 6-contact module) and smaller than or equal to the size of a mini card 2FF (25 mm×15 mm: 375 mm2). The manufacturing technology for manufacturing a chip card-type module in a reel of continuous insulating tape (reel-to-reel) (particularly in 35 mm tape width) can support this size equal to or slightly smaller than 25×15 mm. These modules can subsequently be overmoulded or inserted into a card body cavity of a size greater than or equal to the size of the module. The chip card-type modules concerned by the invention therefore preferentially cover standard chip card modules and/or electrical and/or electronic modules that can be manufactured using the same chip card technology.

The smaller the form factor of the support body, the greater the observance of a constant resonance frequency, to ensure optimum communication performance of the device with a radio frequency reader.

In general, the area within the external antenna turn of a relay antenna (or of a radio frequency chip antenna positioned remotely in a module support body) is larger than the area of the main face of a micromodule intended to be embedded in a support body.

Therefore, the smaller the radiofrequency device with a micromodule, embedded in a cavity of its support body, the more the change of chip is critical, since it must be possible to be able to adjust the capacitance and/or inductance in the module to compensate for the variation in internal capacitance of the chip.

The module in the invention generally comprises a dielectric substrate (or insulating layer) carrying the capacitance in plates or tracks and/or the antenna; the main surface of the module is smaller than the main surface of the support body into which it is inserted or incorporated, in particular by insertion into a cavity of the support body.

The invention claimed is:

1. Radiofrequency communication device, wherein said device comprises
    an insulating support layer,
    an electrical and/or electronic radiofrequency circuit comprising conductive plates of an adjustable capacitor and an antenna helix, said helix and at least one first plate of said conductive plates extending on a first face of said support layer, at least two second plates of said conductive plates connected electrically by at least one electrical connection and arranged on a second face of said support layer so as to oppose said at least one first plate, and
    at least one element for adjusting a tuning frequency of the radiofrequency circuit, wherein said adjustment element splits or connects the conductive plates to adjust the capacitance,
    wherein said at least two second plates are connected electrically by at least one electrical connection formed of non-switching conductive material, and
    wherein said conductive plates and/or said helix are directly supported on said insulating support layer to define an electrical and/or electronic module of a chip card type.

2. Device according to claim 1, wherein the module has a main face having an area less than or equal to 375 mm$^2$.

3. Device according to claim 1, wherein said adjustment element's adjustment equals or compensates for a variation in internal capacitance of the radiofrequency circuit greater than 5 μF.

4. Device according to claim 1, comprising a support body incorporating or interacting with said module, wherein the support body bears an electrical element of the electrical and/or electronic circuit, and wherein said electrical element is configured to connect or interact with the module.

5. Device according to claim 4, wherein said electrical element is selected from among a radiofrequency chip, a second antenna, a relay antenna and a second capacitance configured to connect or interact with said electrical circuit.

6. Device according to claim 1, wherein said at least one electrical connection between said two second conductive plates is a bonded wire.

7. Device according to claim 1, wherein said at least one electrical connection between said two second conductive plates is a conductive printing or an electrically conductive deposit.

8. Device according to claim 1, wherein said at least one electrical connection is pre-wired by metallization of the insulating support layer and has a cutting mark.

9. Device according to claim 1, wherein the antenna helix is formed on the module, comprises several turns and features connection ends or terminals emerging on a face of the module.

10. Device according to claim 1, wherein the antenna helix is formed outside the module and wherein the module comprises interconnection pads emerging on a face of the module, wherein said pads are configured to connect antenna connection ends or terminals.

11. Device according to claim 1 forming a chip card or a passport and comprising a passive antenna coupled electromagnetically to the antenna helix formed on the module.

12. Device according to claim 1, wherein a further adjustment element connects an intermediate point of the helix to reduce the available inductance.

13. Method for manufacturing a radiofrequency communication device with a chip, wherein said device comprises:
   an insulating support layer,
   an electrical and/or electronic radiofrequency circuit on comprising conductive plates of an adjustable capacitor and an antenna helix, said helix and at least one first plate of said conductive plates extending on a first face of said support layer, at least two second plates of said conductive plates connected electrically by at least one electrical connection and arranged on a second face of said support layer so as to oppose said at least one first plate, and
   at least one element for adjusting a tuning frequency of the radiofrequency circuit, wherein said adjustment element is configured so as to split or connect the conductive plates to adjust the capacitance,
   wherein said at least two second plates are connected electrically by at least one electrical connection formed of non-switching conductive material, and
   wherein said conductive plates and/or said helix are directly supported on said insulating support layer to define an electrical and/or electronic module of a chip card type.

\* \* \* \* \*